March 24, 1964 W. R. HOWARD 3,126,079
HYDRODYNAMIC DEVICE WITH LOCK-UP CLUTCH
Filed Aug. 27, 1958 4 Sheets-Sheet 1

INVENTOR.
WAYNE R. HOWARD
BY
Kenneth C. With
ATTY.

March 24, 1964 W. R. HOWARD 3,126,079
HYDRODYNAMIC DEVICE WITH LOCK-UP CLUTCH
Filed Aug. 27, 1958 4 Sheets-Sheet 4

INVENTOR.
WAYNE R. HOWARD
BY
Kenneth C. Witt
ATTY.

United States Patent Office 3,126,079
Patented Mar. 24, 1964

3,126,079
HYDRODYNAMIC DEVICE WITH LOCK-UP CLUTCH
Wayne R. Howard, Jackson, Mich., assignor to Clark Equipment Company, a corporation of Michigan
Filed Aug. 27, 1958, Ser. No. 757,526
7 Claims. (Cl. 192—3.2)

This invention relates to hydrodynamic torque converters and fluid couplings having a lock-up clutch, that is, a clutch for mechanically connecting together driving and driven members in order to provide a direct drive through the hydrodynamic device.

It is known that rotary hydrodynamic devices which depend upon fluid impact or other fluid action between driving and driven members thereof for the transfer of energy inherently have a certain amount of slip even under the most favorable operating conditions. Such slip between the driven and driving members introduces a speed differential and losses due to fluid turbulence and the like which, of course, represent a loss in efficiency. It is known, therefore, to provide lock-up clutches to mechanically connect together driving and driven elements of such devices under certain conditions of operation in order to eliminate the disadvantages of slip and losses.

The principal object of the present invention is to provide a hydrodynamic device having a lock-up clutch which utilizes a minimum number of parts and does not increase the length of the hydrodynamic device as is the case with many previously known lock-up clutches.

A more specific object is to utilize the annular space defined by the impeller, turbine and reaction members, which space is present in most fluid torque converters but has been wasted hitherto in most instances, for containing the lock-up clutch.

In carrying out my invention in one preferred form, I provide a lock-up clutch for a fluid torque converter having an impeller or driving member, a turbine or driven member, and a reaction member. These three annular members or wheels are formed to provide an annular space between them and the lock-up clutch is located in this space. The clutch includes friction disks and a reciprocable piston for compressing them to engage the clutch. This piston is operated by fluid under pressure which is admitted to the clutch by a conduit through a blade of one of the wheels. The clutch is disengaged by the pressure in the fluid circuit of the torque converter.

For a clear and more complete understanding of my invention, reference should be had to the accompanying drawing in which.

Figure 1:
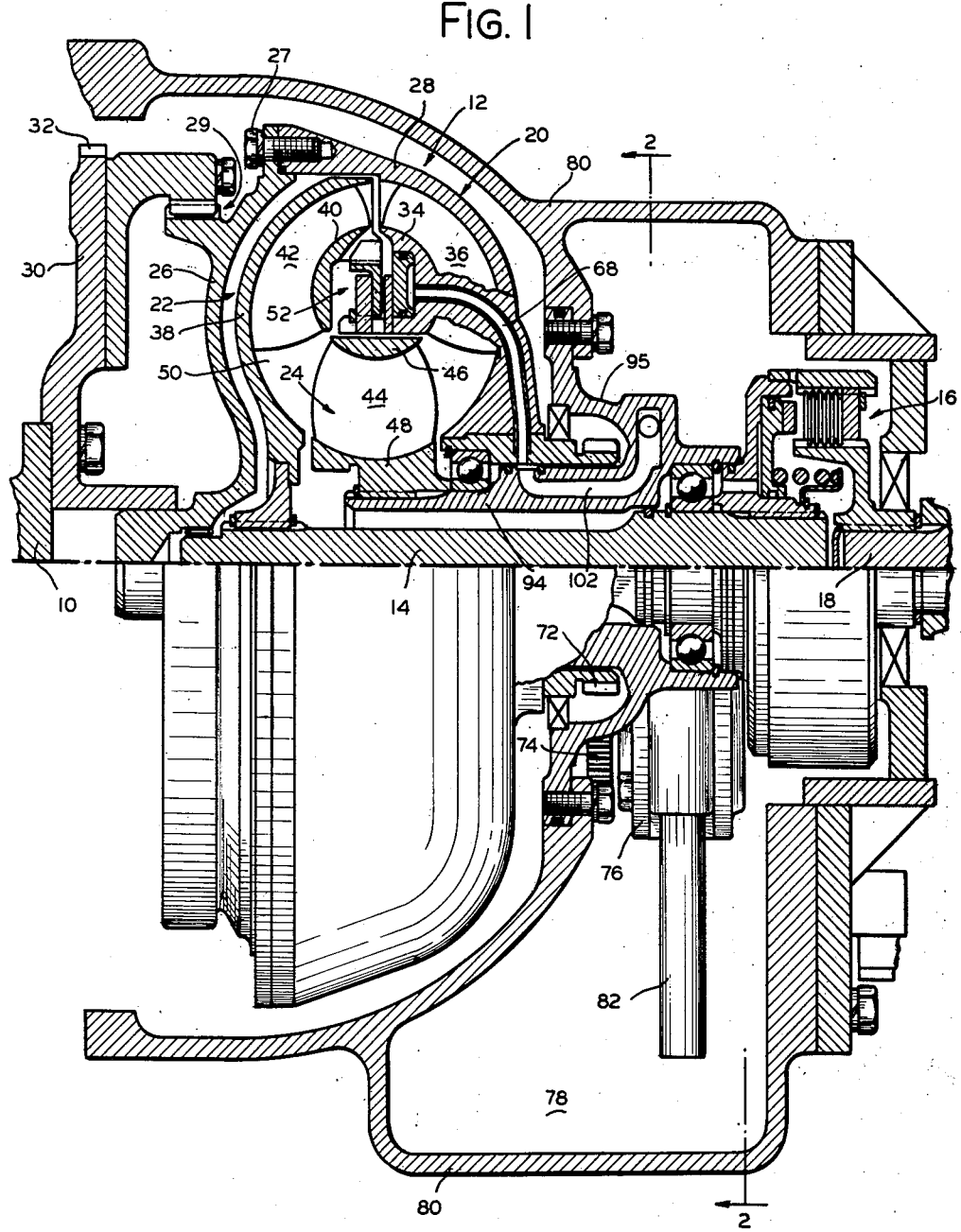
FIGURE 1 is a cross-sectional view taken through a hydrodynamic torque converter and showing a lock-up clutch associated therewith in accordance with the present invention.

In the embodiment of the invention chosen for illustration, a drive shaft 10 is connected to an engine (not shown) and to a hydrodynamic torque converter 12 which automatically multiples the torque of the engine, when necessary, as the engine operates a driven shaft 14 through the medium of the torque converter. The driven shaft 14 may be connected through a multiple plate clutch 16 to any desired operating mechanism such as the transmission of a vehicle, the input shaft of which is designated by reference numeral 18.

The fluid torque converter 12 is of a known three wheel type and includes an impeller wheel 20, a turbine wheel 22, and a reaction member or stator 24. The impeller wheel 20 includes an annular outer shell portion 28 which is connected to a member 26 by suitable means such as a plurality of machine screws 27. The member 26 is annular in shape and follows the outer contour of the turbine 22; and member 26 is suitably secured to the drive shaft 10 for rotation therewith as by a gear coupling at 29. The connection between drive shaft 10 and member 26, as shown, includes an annular plate 30 which carries an annular toothed portion 32 at its outer periphery to provide for cooperation with the gear of an electric starter motor in the event the present mechanism is used with an internal combustion engine, as is well known in the art.

The impeller member 20 comprises an outer shell 28 of semi-toroidal shape and an inner ring portion 34, and vanes 36 extending between and connected to the shell and ring. The turbine 22 also comprises a semi-toroidal shell portion 38 and an inner ring portion 40 having vanes 42 extending between and secured to the shell and ring. The stator 24 comprises vanes 44 extending between an inner ring portion 46 and an outer ring portion 48.

It will be understood that the outer and inner shells and rings of each vaned element described are annular, although only portions of such shells and core rings are illustrated in the drawing, while the vanes are curved and usually are of varying thickness, such as those shown in U.S. Patents 2,306,758 and 2,410,185. The three vaned elements form and function as a hydrodynamic torque converter with the vanes of the impeller 20 functioning to impart energy to a body of fluid or liquid in the chamber 50, formed by the three vaned members, the turbine 22 receiving energy from the fluid, and stator 24 being held from rotation and functioning as a reaction element to change the direction of the flow of fluid so that the device functions to multiply torque. The shells, vanes, and rings of the vaned elements described preferably are of aluminum and may be formed as integral units by sand-casting, plaster mold casting, or other known method.

During operation of torque converter 12 the speed of rotation of turbine member 22 is always less than the speed of impeller 20, when energy is being transmitted from the engine through the torque converter to a driven mechanism. The amount by which the speed of turbine 22 is less than the speed of impeller 20 is dependent upon the amount of torque multiplication occurring in the torque converter, and the greater the torque multiplication the greater the difference in speed. Even when there is substantially no torque multiplication the speed of the turbine is still slightly less than the speed of the impeller. Under some conditions of operation it is desirable to connect the impeller and turbine together mechanically for direct drive without such slip, and for this purpose a lock-up clutch is provided. This lock-up clutch which is indicated generally by the numeral 52 is located in an annular space or cavity formed by the three torque converter wheels, the impeller, the turbines and the reaction member.

Figure 3:
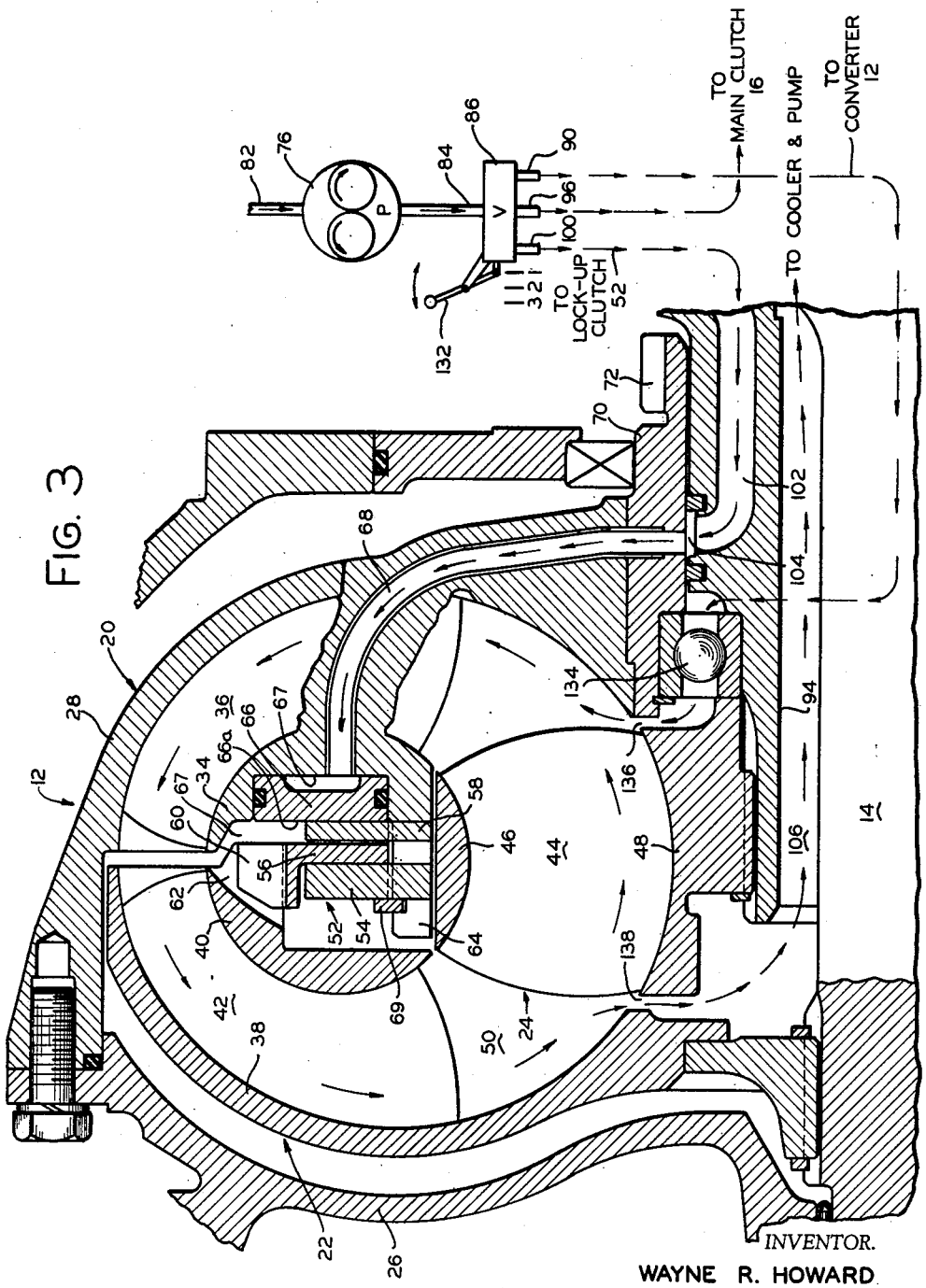
FIGURE 3 is a partial cross-sectional view on an enlarged scale showing the lock-up clutch and its relationship to the impeller and turbine members together with a schematic showing of one form of control arrangement for the various operating elements of the device.

As shown best in FIGURE 3, the lock-up clutch 52 is constructed of a plurality of annular members which operate on the principle of multiple-plane friction. The clutch comprises a series of alternating plates or disks 54, 56 and 58 so arranged that the disk 56 rotates with the turbine wheel 22, being connected thereto by means of cooperating intermeshing teeth 60 and 62 formed on the disk 56 and the ring portion 40 of the turbine wheel respectively. The disks 54 and 58 are provided with suitable teeth on their inner peripheries for intermeshing cooperation with a plurality of axially projecting teeth formed on the axially extending portion 64 of ring 34 of the impeller wheel 20. The disks 54, 56 and 58 are adapted for sliding movement axially of the torque converter, and when they are pressed together in frictional engagement, the clutch is engaged and motion is transmitted directly from the impeller wheel 20 to the turbine wheel 22 without slip.

A piston 66 is fitted within an annular recess 67 in the ring portion 34 of the impeller wheel 20 for axial sliding movement relative thereto and, when moved toward the left from the position shown in FIGURE 3, causes the disks 54, 56 and 58 to be pressed together, with the snap ring 69 serving as a backing plate. In order to cause movement of the piston in such direction to produce engagement of the lock-up clutch 52, means are provided to admit fluid under pressure to the annular recess 67 in which the piston 66 is located. For this purpose, a suitable conduit 68 is provided which preferably is formed in the impeller wheel 20 during the casting thereof. Conveniently, the conduit 68 may be provided by locating a tube of a suitable high temperature resistant metal in the mold in such a manner that it will extend through one of the impeller blades, and then casting the metal of which the impeller wheel is made around such tube. It will be appreciated, however, that the conduit may be formed in other ways, if desired. Means are provided for supplying fluid under pressure to the conduit 68 when desired as will now be described.

Figure 4:
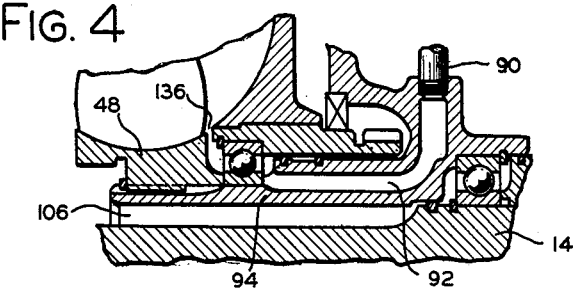
FIGURE 4 is a fragmentary sectional view taken along the line 4—4 of FIGURE 2 on a horizontal plane showing additional details of the passageways for supplying fluid to the torque converter chamber.

A sleeve 70 is secured to the impeller wheel 20 so as to rotate therewith. The sleeve 70 is provided with a gear portion 72 which meshes with a gear 74 which in turn drives a gear pump 76 which draws fluid from a suitable reservoir, such as sump 78 in the housing 80, by means of an inlet tube 82. The pump transmits fluid under pressure through a conduit 84 (see FIGURES 2 and 3) to passageway 88 in a valve and regulator block 86. Conduit 84 connects through valve block 86 with a conduit 90 leading into the torque converter cavity 50 by way of a passageway 92 formed in sleeve 94 which supports the stator 24 and rotatably supports impeller 20. FIGURE 4 shows, in a fragmentary sectional view along the line 4—4 of FIGURE 2, the details of this arrangement. Sleeve 94 is connected by a reentrant portion 95 to the main housing 80. Fluid under pressure is also selectively conducted from the valve block 86 through a conduit 96 and into a second passageway 98 in sleeve 94 for operation of the main multiple disk clutch 16. Fluid under pressure is further selectively conducted from the valve block 86 through a conduit 100 into a third passageway 102 in the sleeve 94 which communicates with the conduit 68 by means of an annular recess 104 on the exterior of the sleeve 94 to direct the fluid to operate the piston 66.

Figure 2:
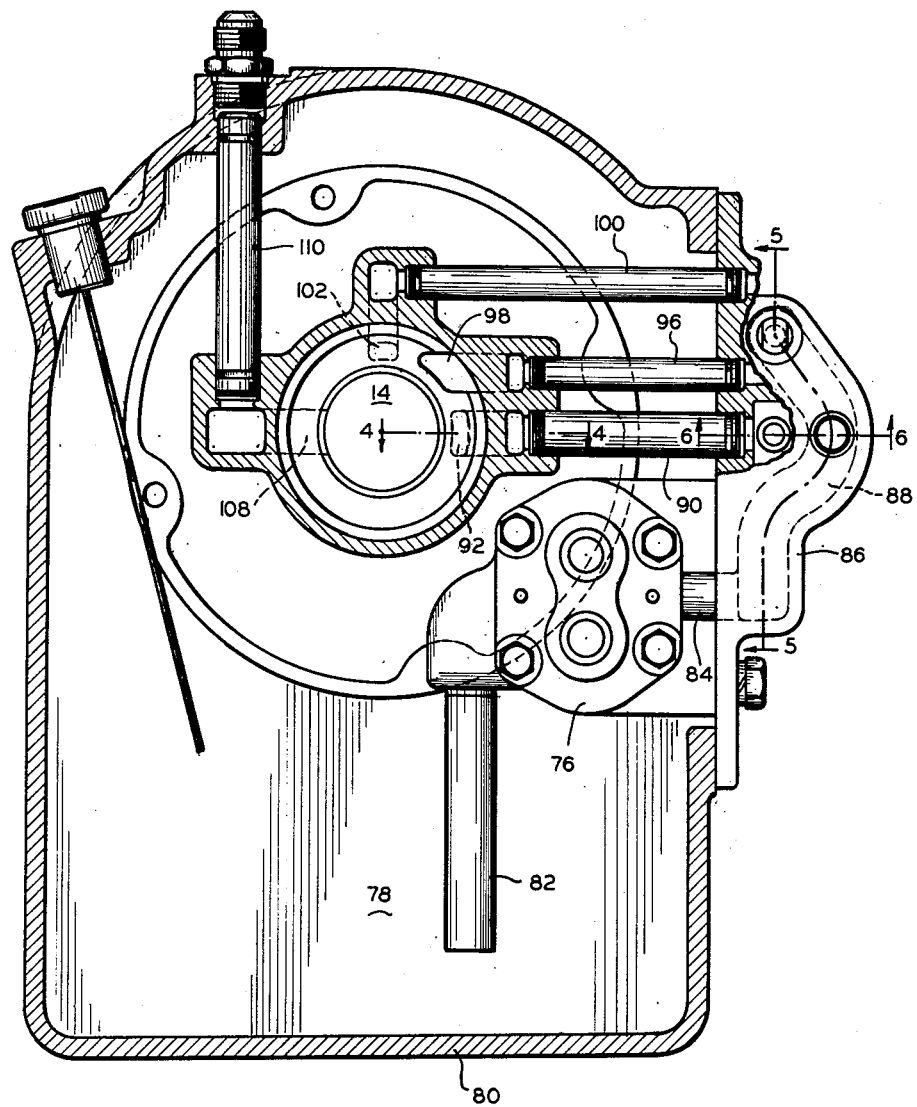
FIGURE 2 is a cross-sectional view taken substantially along the line 2—2 of FIGURE 1 and illustrates generally the manner in which fluid is conducted to the various operating elements.
Figure 5:
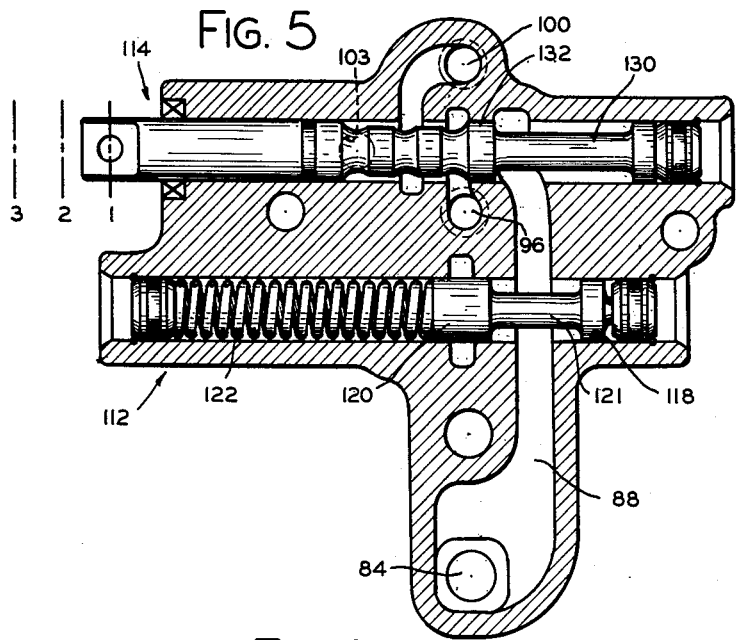
FIGURE 5 is a sectional view along the line 5—5 in FIGURE 2 showing additional details of the control valve and regulator valves.
Figure 6:
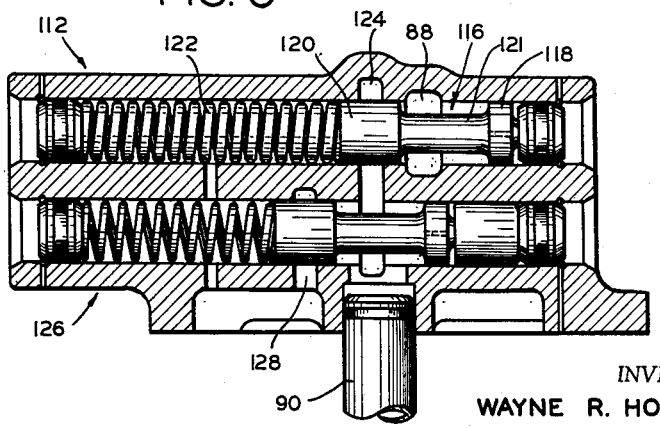
FIGURE 6 is a sectional view along the line 6—6 of FIGURE 2 showing details of the regulator valves.

FIGURES 5 and 6 show sectional views along the lines 5—5 and 6—6 in FIGURE 2, showing the arrangement employed in this particular mechanism for regulating fluid pressures and controlling the flow of fluid to the various locations in the mechanism. In passageway 88 fluid from the pump flows through a regulator or relief valve indicated generally by the numeral 112 and to a selector valve indicated generally by the numeral 114. Referring to FIGURE 6, regulator valve 112 is of conventional construction and comprises a spool portion 116 having a piston portion 118 at one end and a second piston portion 120 at the other end and an intermediate annular recessed portion 121. A regulating spring 122 urges spool 116 to the right, but when the pressure in passageway 88 is sufficient to overcome the force of the spring the spool 116 is moved toward the left and fluid is discharged from valve 112 through passageway 124 into a second similar regulating valve as indicated generally by the numeral 126.

Valve 126 has a weaker spring and regulates at a lower pressure than valve 112, discharging excess fluid through opening 128 back to the sump, while fluid at the lower regulated pressure flows through conduit 90 into the torque converter cavity.

Fluid at the higher regulated pressure in passageway 88 is available at selector valve 114 to operate either the main multiple disk clutch 16 or clutch 16 and the lock-up clutch 52 jointly. I have indicated in FIGURE 5 passageway 88 and the conduits 100 and 96 to the lock-up clutch and the main clutch respectively. It will be appreciated by those skilled in the art that with spool member 130 of valve 114 in the position illustrated in FIGURE 5 that piston portion 132 of the spool member blocks the flow from passageway 88 to either of the other two. This is indicated as position 1 in FIGURES 3 and 5. As spool member 130 is moved to the left to position 2, piston portion 132 moves to the left also and permits flow from passageway 88 to conduit 96. Further movement of spool 130 into the left position 3 connects passageway 88 to both conduits 96 and 100.

It will be readily understood that with the arrangement of control valve and regulating valves illustrated and described herein, that a relatively high pressure, which may be, for example, 150 pounds per square inch is provided for operating the main clutch and the lock-up clutch, while a lower pressure, which may be in the range of 30–40 pounds per square inch is provided for charging the torque converter.

Let it be assumed now, for example, that torque converter 12 is connected to the input shaft of a transmission for a vehicle. Such shaft is indicated at 18 in FIGURE 1. The vehicle operator may selectively connect or disconnect the torque converter from the transmission through operation of the main clutch 16. In order to connect the torque converter to the transmission, the main clutch 16 is engaged by moving the control lever 132, shown schematically in FIGURE 3, which is connected to spool member 130 of FIGURE 5. Operation which moves spool 130 from position 1 to position 2 opens communication between the pump 76 and the main clutch by way of passages and conduits 84, 88, 96 and 98. In this position, the transmission will be operated by and through the torque converter 12 in a conventional manner. Now, assuming that the vehicle has been accelerated to a speed where the torque multiplication by the torque converter is no longer desired, the operator may cause the lock-up clutch 52 to engage by further manipulation of the control lever 132 to position 3 to thereby open the fluid circuit to the lock-up clutch by way of conduits 100 and 102 without disturbing the fluid circuit to the main clutch 16. Fluid under pressure will then cause the piston 66 to move to engage the disks 54, 56 and 58 to thus directly couple the impeller wheel 20 to the turbine wheel 22 so that a one-to-one drive ratio exists between the drive shaft 10 and the driven shaft 14.

If, subsequently, the operator should desire to disengage the lock-up clutch 52 and drive through the converter 12, all that he need do is manipulate the lever 132 to disconnect the fluid circuit through the tube 68 and conduits 100 and 102 from pump 76 and drain the fluid therein back to sump 78 through an opening 103, thereby relieving the pressure on the piston 66. The pressure of the circulating fluid within the torque converter housing 50 then causes the piston 66 to be moved back to its initial right-hand position thereby disengaging the lock-up clutch 52.

It will be readily appreciated that there is always fluid pressure in torque converter chamber 50 during operation, due to the pressure of the entering fluid which enters through passageway 92 and due to flow restrictions in the external oil lines and cooler. It is this pressure within the torque converter chamber which is utilized to disengage the lock-up clutch. The fluid which enters the torque converter housing from passageway 92 passes through ball bearing 134 and enters the torque converter chamber through annular opening 136 between the impeller 20 and reaction member 24. After entering at 136 the fluid follows a toroidal path, counterclockwise in the views of FIGURES 1 and 3, and recirculates within the torque converter. However, a portion of the circulating fluid is discharged from the converter through opening 138 between the turbine 22 and the reaction member 24, thus providing continuous flow through the converter for cooling purposes. From opening 138 the fluid flows through annular passage 106 to lateral passage 108 (see FIGURE 2), thence through conduit 110 and through a cooler (not shown) and back to the sump 78.

It will be appreciated that the fluid pressure within the torque converter chamber exerts a continuous force on piston 66 tending to move it to the right and disengage the clutch. The fluid under pressure in the torque converter chamber fills the space 67 between the impeller and turbine members and exerts a continuous pressure on left hand surface 66a of the piston to accomplish this action.

It will be apparent that my lock-up clutch structure, while effective, is nevertheless simple, easy to construct, and adds a minimum of parts to the torque converter. As illustrated, it employs three toothed circular disks, but it is possible to utilize only two, if desired. It is essential that there be at least one disk connected to each of the two rotating members to be clutched together. The snap ring 69 or other stop member is required to retain the disks in position and provide a stop against which the piston can act to force the disks into frictional engagement. Other than these elements, this clutch construction adds only the piston and an opening or conduit through one of the wheels, plus, of course, the external control equipment which is necessary for selectively controlling the lock-up clutch. The use of the fluid pressure within the converter chamber for releasing the clutch eliminates springs or other means which are commonly employed for this purpose.

With the foregoing description in mind, it will be apparent that the present invention provides a new and novel arrangement and operation of a lock-up clutch embodied in a hydrodynamic device which utilizes existing space within the device which space would otherwise be wasted. The lock-up clutch can therefore be adapted to existing torque converter designs without extensive modification thereof, resulting in a considerable saving in tooling and manufacturing costs. Also, as described hereinbefore, the impeller wheel and the turbine wheel are provided with integrally formed teeth for engagement with the friction disks of the lock-up clutch, which teeth may be formed in the initial casting of the bladed wheels thereby resulting in further manufacturing economies and a saving in the total number of additional parts required. Further, one of the rotatable elements may be provided with an integrally formed tube or conduit for directing the pressure fluid to operate the lock-up clutch, thus further simplifying the manufacture and assembly of a torque converter embodying a lock-up clutch made in accordance with the present invention.

While I have illustrated and described herein a preferred embodiment of my invention it will be understood that modifications may be made by those skilled in the art. For example, it will be apparent that this invention could be embodied in a fluid coupling having only two vaned wheels, an impeller and a turbine, instead of three wheels as in the hydrodynamic device illustrated. Also, it can be readily applied to hydrodynamic devices having more than three wheels. Still another modification by way of example is to put the conduit for conducting fluid to the lock-up clutch in the driven or turbine member instead of the impeller or driving member of the hydrodynamic device.

It should be understood, therefore, that I intend to cover by the appended claims all such modifications which fall within the true spirit and scope of my invention.

I claim:

1. In a hydrodynamic device including a rotatable bladed impeller wheel having an annular recess therein and a rotatable bladed turbine wheel in confronting relation to the impeller wheel, the device being adapted to contain fluid for transmitting torque between the impeller wheel and the turbine wheel and the two wheels providing an annular space between bladed portions thereof, a fluid pressure operated friction clutch located in the said annular space providing additional torque transmitting means between said impeller wheel and said turbine wheel, said clutch comprising a pair of internally toothed friction disks operatively connected to the impeller wheel, an externally toothed friction disk located between said first-mentioned pair of friction disks and operatively connected to the turbine wheel and an annular piston positioned in the said annular recess, a conduit in one of said wheels, and means for connecting said conduit with a source of fluid under pressure for selectively engaging said friction clutch.

2. In a hydrodynamic device, a driving member, a driven member, said driving and driven members having bladed portions thereon, said bladed portions defining an annular space therebetween, fluid for transmitting torque between said members, a fluid pressure operated clutch located in the said annular space for transmitting torque between said members when it is engaged, said clutch comprising an externally toothed portion on said driving member, a pair of internally toothed annular friction disks positioned on the said internally toothed portion, an internally toothed portion on said driven member, an externally toothed friction disk located on said last-mentioned internally toothed portion and between the first-mentioned pair of friction disks, the said driving member including an annular recess, a piston mounted in said recess, a conduit in said driving member in communication with the said recess, a connection to a source of fluid under pressure, and selective means for moving supplying fluid under pressure from the source through said conduit and moving the said piston for engaging said clutch.

3. In a hydrodynamic device, a rotatable driving member having a bladed portion, a confronting rotatable driven member having a bladed portion, said bladed portions defining an annular space therebetween, fluid for transmitting torque between said members, a friction disk clutch located in the annular space between said bladed portions for transmitting torque between said rotatable members, said clutch having at least one friction disk coupled to each of said members for rotation therewith and having a reciprocable annular piston operatively associated with one of said rotatable members, connections to a source of fluid pressure, and means associated with said one of said rotatable members for selectively conducting fluid from the source of fluid under pressure to one surface of said piston for engaging said clutch.

4. In a hydrodynamic torque converter, a rotatable driving member and a rotatable driven member having an annular space therebetween, first fluid means under pressure for transmitting torque between said members, a friction disk clutch located in said annular space for mechanically connecting said members, said clutch having a plurality of friction disks and at least one of said friction disks secured for rotation with each of said rotatable members, a fluid pressure operated piston disposed in said annular space operatively associated with one of said rotatable members and movable axially relative to said one rotatable member for engaging said clutch, means associated with said one of said members for conducting fluid from a source of fluid under pressure to one surface of said piston for causing engagement of said clutch, control means for selectively opening and closing the fluid circuit to said last named means, and said clutch being arranged so that the pressure of said first fluid means disengages the said clutch when said control means is moved to the closed position.

5. In a hydrodynamic torque converter, a rotatable driving member including a bladed portion and an adjoining annular ring portion thereon and a rotatable driven member including a bladed portion and an adjoining inner ring portion thereon, the two said ring portions forming an annular space therebetween, fluid means for transmitting torque between said members, a friction disk clutch comprising a plurality of toothed friction disks located in said annular space for transmitting torque between said members, each of said ring portions having a plurality of teeth integrally formed thereon for slidably receiving alternate ones of said friction disks, and one of said ring portions having an annular recess adjacent one of said friction disks, an annular piston mounted within said recess and movable therein, and said one of said members having a fluid conducting conduit integrally formed therein for conducting fluid under pressure into said annular recess for causing said piston to move into engagement with said one of said friction disks, thereby to engage said clutch.

6. In a hydrodynamic torque transmitting device, a rotatable driving member and a rotatable driven member having an annular space therebetween, fluid under pressure for transmitting torque between said members, a clutch located in the annular space between said members for transmitting torque therebetween, said clutch including a piston having one surface thereof exposed to the said fluid under pressure for normally biasing said clutch to disengaged position, and one of said members being provided with conduit means adapted to be selectively connected to a source of pressure and with the opposite surface of said piston to overcome the disengaging bias to engage said clutch.

7. A fluid torque converter having at least three coaxially positioned rotatable bladed wheel members including an impeller member, a turbine member and a reaction member, said impeller wheel member including an outer shell portion and an inner ring portion interconnected by curved blades, said turbine member including an outer shell portion and an inner ring portion interconnected by curved blades, said reaction member including inner and outer ring portions interconnected by curved blades, said bladed wheels being positioned in nested relation and arranged to define an internal annular space, a lock-up clutch positioned in the said annular space, said clutch comprising an externally toothed axially extending extension portion on the said ring portion of the impeller member, a pair of internally toothed friction disks positioned on the said axially extending projection portion in meshing relation therewith, an internally toothed portion on the said inner ring portion of the said turbine member, an externally toothed friction disk located between the said first mentioned pair of friction disks and in meshing relation with the said toothed portion on the turbine member, the said inner ring portion of the impeller member including an annular recess, a piston mounted in said recess for reciprocal movement therein and arranged to engage one of the said pair of disks and compress all of the disks into frictional engagement, a conduit through one of the blades of the said impeller wheel arranged to conduct fluid to the said recess for actuating the said piston in the clutch engaging direction, connections to a source of fluid under pressure, control means for selectively admitting fluid under pressure from the source through the said conduit to the recess to engage the clutch, and torque transmitting fluid substantially filling the torque converter and circulating through the three bladed wheels, said torque transmitting fluid exerting pressure on the said piston to urge it in the disengaged direction.

References Cited in the file of this patent

UNITED STATES PATENTS

| 1,298,990 | Mason | Apr. 1, 1919 |
| 2,235,573 | Dodge | Mar. 18, 1941 |
| 2,408,951 | Pollard | Oct. 8, 1946 |
| 2,632,539 | Black | Mar. 24, 1953 |
| 2,731,119 | Burdett et al. | Jan. 17, 1956 |
| 2,920,728 | Forster | Jan. 12, 1960 |

FOREIGN PATENTS

| 479,119 | Germany | July 2, 1927 |
| 961,058 | Germany | Mar. 14, 1957 |